United States Patent
Pan et al.

(10) Patent No.: US 7,971,238 B2
(45) Date of Patent: Jun. 28, 2011

(54) TWO-FACTOR AUTHENTICATION OF A REMOTE ADMINISTRATOR

(75) Inventors: Weimin Pan, Austin, TX (US); Gang Liu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 900 days.

(21) Appl. No.: 11/465,945

(22) Filed: Aug. 21, 2006

(65) Prior Publication Data

US 2008/0046967 A1  Feb. 21, 2008

(51) Int. Cl.
*H04L 29/00* (2006.01)
(52) U.S. Cl. .............. 726/9; 713/182; 713/183
(58) Field of Classification Search ............ 726/2, 9; 713/182–183
See application file for complete search history.

(56) References Cited

U.S. PATENT DOCUMENTS

| | | | | |
|---|---|---|---|---|
| 5,287,519 | A * | 2/1994 | Dayan et al. ................ | 726/16 |
| 7,364,087 | B2 * | 4/2008 | Zimmer et al. .............. | 235/492 |
| 2003/0037259 | A1 * | 2/2003 | Koistinen et al. ............ | 713/201 |
| 2003/0037268 | A1 * | 2/2003 | Kistler ........................ | 713/310 |
| 2003/0145205 | A1 * | 7/2003 | Sarcanin ...................... | 713/172 |
| 2003/0159053 | A1 * | 8/2003 | Fauble et al. ................ | 713/189 |
| 2004/0124246 | A1 * | 7/2004 | Allen et al. .................. | 235/492 |
| 2004/0238644 | A1 * | 12/2004 | Leaming ...................... | 235/492 |
| 2005/0144444 | A1 | 6/2005 | Hall et al. .................... | 713/168 |
| 2006/0259612 | A1 * | 11/2006 | De Oliveira et al. ......... | 709/224 |

OTHER PUBLICATIONS

Weimin Pan et al.; "Remote Management With: Virtual Media in the DRAC 4"; Dell Power Solutions; pp. 4, Oct. 2004.

\* cited by examiner

*Primary Examiner* — Nasser Moazzami
*Assistant Examiner* — Ghazal Shehni
(74) *Attorney, Agent, or Firm* — Baker Botts L.L.P.

(57) ABSTRACT

An information handling system includes a processor, system memory, and a remote access resource that includes a virtual card reader enabled to establish a communication channel between the remote access resource and a remote card reader to communicate smart card reader access requests and response between them. The system may include an authentication module requiring two factor authentication including userid/password authentication and a physical card authentication. The communication channel enables remote physical card authentication. The resource further supports redirection of system console traffic enabling remote userid/password authentication. The virtual card reader is preferably operable to download a virtual card reader client to a remote management station to which the smart card reader is attached. The remote access resource may be operable to direct console traffic of the system to the remote management station to display a system login screen on the remote management station.

15 Claims, 4 Drawing Sheets

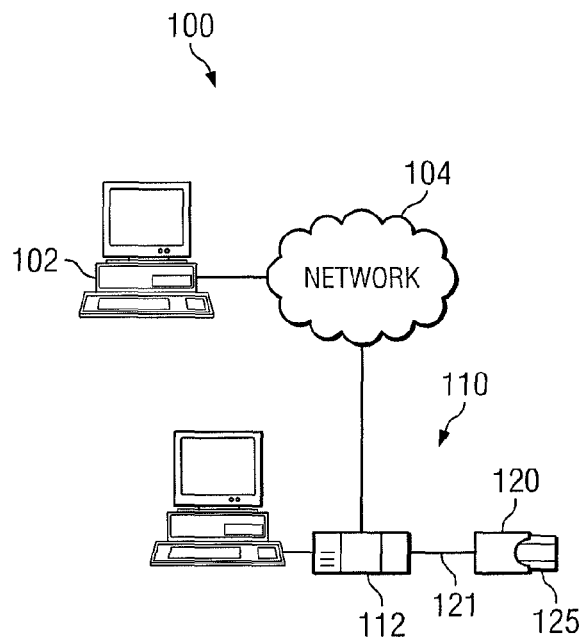
FIGURE 1
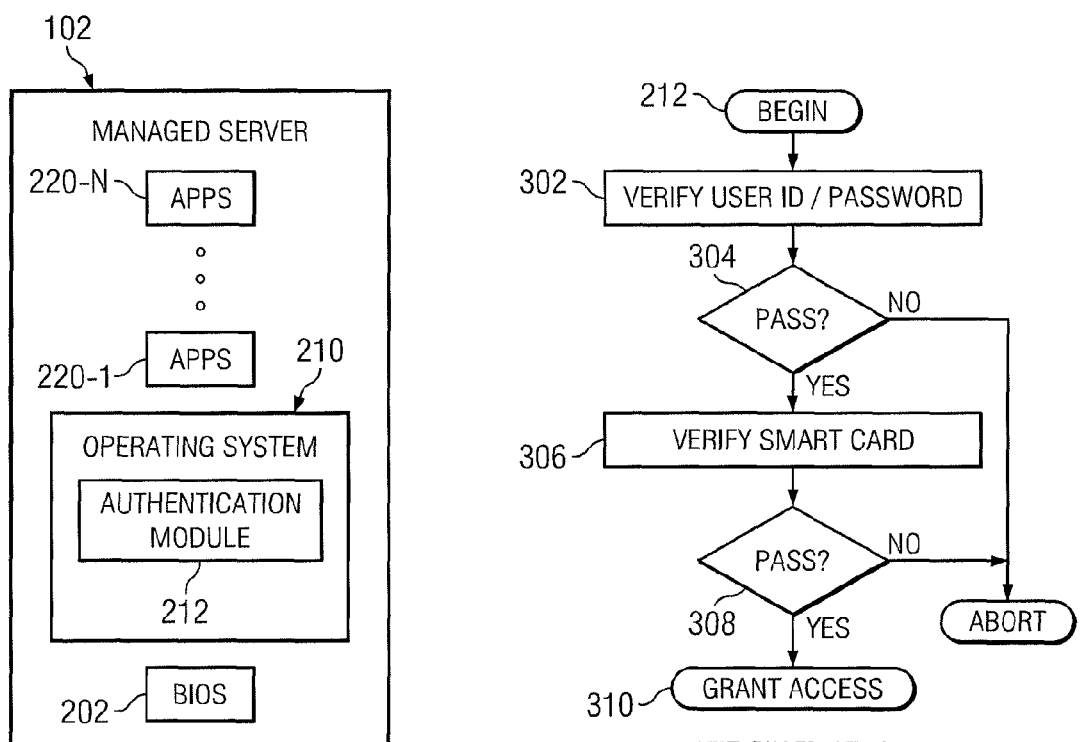
FIGURE 2
FIGURE 3

TWO-FACTOR AUTHENTICATION OF A REMOTE ADMINISTRATOR

TECHNICAL FIELD

The present invention is related to the field of information handling systems and, more particularly, information handling systems that require two-factor authentication.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a server which is a processor-based network device that manages network resources. As examples, a file server is dedicated to storing files, a print server manages one or more printers, a network server manages network traffic, and a database server processes database queries. A Web server services Internet World Wide Web pages.

In order to enhance security, some companies have standardized two-factor authentication on all servers and client systems. In such systems, users must have a physical card (a smart card) and its password (PIN number) in order to log into a system. In a network environment, where a user is or may be logging into a remote server, two-factor authentication presents a problem because the user is not physically present at the server system in which the authentication module expects the user to insert a smart card.

Currently, users access remote servers through a module referred to herein as a remote access card (RAC). Unfortunately, the RAC only redirects keyboard/mouse traffic during a console redirection session. Remote users cannot, therefore, log in to a server via RAC console redirection if two-factor authentication is mandatory.

SUMMARY OF THE INVENTION

Therefore, a need has arisen for an information handling system that enables a remote user to log on to a server that requires two-factor authentication.

The present disclosure describes a system and method enabling a remote user to log into a server system that requires two-factor authentication.

In one aspect, a disclosed information handling system includes a processor and system memory accessible to the processor. A bus bridge provides an interface between a peripheral bus and the processor. A remote access resource connected to the peripheral bus includes a virtual card reader enabled to establish a communication channel between the remote access resource and a remotely located smart card reader to communicate smart card reader access requests and response between them. The system may include an authentication module requiring two factor authentication including userid/password authentication and a physical card authentication and further wherein the communication channel enables remote physical card authentication. The remote access resource further supports redirection of system console traffic enabling remote userid/password authentication. The virtual card reader is preferably operable to download a virtual card reader client to a remote management station to which the smart card reader is attached. The remote access resource may be operable to direct console traffic of the system to the remote management station to display a system login screen on the remote management station. The remote access resource may establish the communication channel by downloading a virtual card reader client to the remote management station, operably attaching the smart card reader to the virtual card reader client, and establishing a the communication channel between the virtual card reader client and a virtual card reader server on the remote access resource. The remote access resource may be connected to a service processor resource by a network connection.

In another aspect, a disclosed computer program (software) product includes instructions for responding to a web request from a remote management station by providing a user interface to the remote management station and instructions for responding to user interface input from the remote management station including instructions for redirecting traffic associated with a console of a data processing system to the remote management station and instructions for virtualizing a smart card reader.

In yet another aspect, a remote access resource for use in an information handling system is disclosed. The remote access resource is operable to support management of the information handling system from a remote management station and further operable to establish a communication channel between the remote access resource and a remote smart card reader.

The present disclosure includes a number of important technical advantages. One technical advantage is the ability to complete two factor authentication from a remote location. Additional advantages will be apparent to those of skill in the art and from the FIGURES, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein:

FIG. 1 is a conceptual representation of selected elements of a network that supports remote, two-factor authentication;

FIG. 2 is a block diagram of selected software elements of a server suitable for use in the network of FIG. 1;

FIG. 3 is a flow diagram of selected elements of an embodiment of two-factor authentication process;

DETAILED DESCRIPTION OF THE INVENTION

Figure 4:
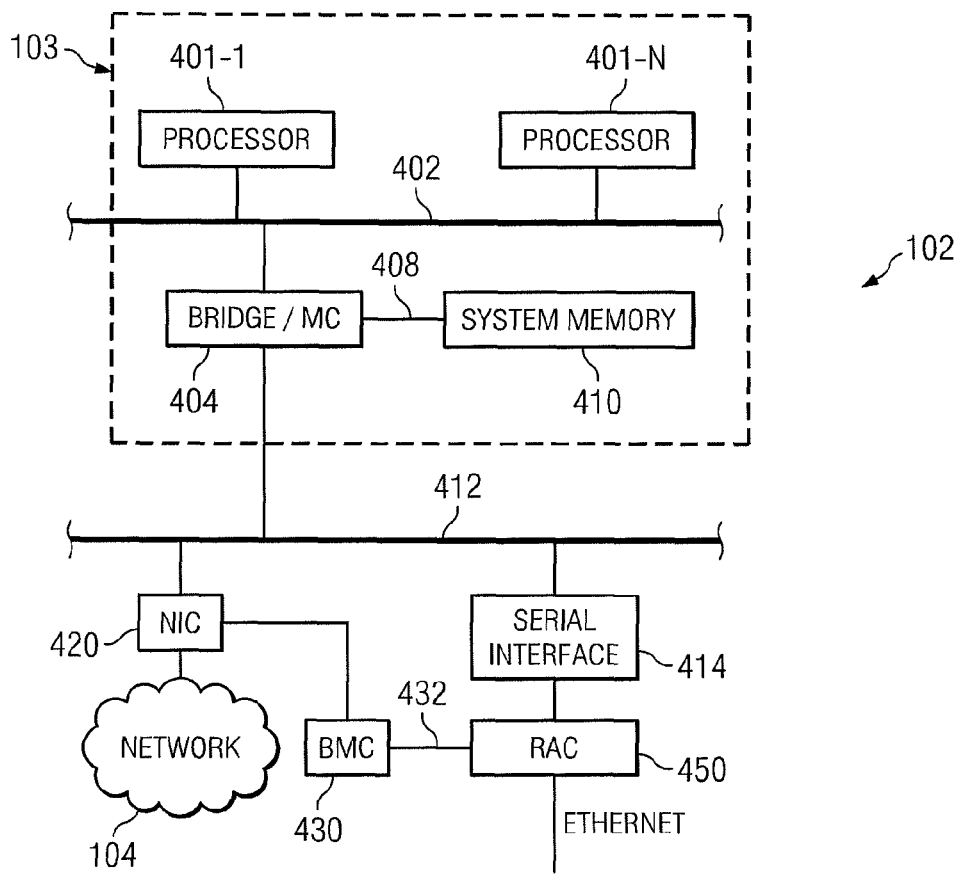
FIG. 4 is a block diagram of selected hardware elements of the server of FIG. 1.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Preferred embodiments and their advantages are best understood by reference to FIG. 1 through FIG. 8, wherein like numbers are used to indicate like and corresponding parts. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In one aspect, an information handling system 100 that supports remote, two-factor authentication is disclosed. Referring to FIG. 1, selected elements of an embodiment of information handling system 100 are shown. In the depicted embodiment, information handling system 100 includes a server 102 and a management station 110 connected through a network 104. Management station 110 includes a conventional desktop or laptop computer 112. A smart card reader, identified as remote card reader 120, is connected to computer 112 via a USB or other suitable connection 121. As depicted in FIG. 1, a smart card 125 is shown as inserted into remote card reader 120. As suggested by its name, management station 110 is connected via network 104 to a management resource of server 102. Using management station 110, a user (e.g., a network administrator) can perform administrative functions with respect to server 102. The list of management functions that may be performed via management station 110 includes, but is not limited to, powering on, powering off, and resetting server 102.

Referring momentarily to FIG. 2, selected software elements of server 102 are shown. In the depicted implementation, server 102 includes a basic I/O system (BIOS) 202, an operating system (OS) 210 and one or more applications 220-1 through 220-N (generically or collectively referred to herein as application(s) 220). The operating system 210 as shown in FIG. 2 includes an authentication module 212. Authentication module 212 is responsible for authenticating a user of server 102 before granting user access.

An implementation of authentication module 212 is conceptually depicted in the flow diagram of FIG. 3. As depicted in FIG. 3, authentication module includes verifying (block 302) user identification information and user password information. If the user identification information and user password information is verified (block 304), authentication module then verifies (block 306) a physical device. An example of a suitable physical device is a smart card. Smart card verification, in a conventional environment, includes a user or administrator physically inserting a smart card into a smart card reader attached to the system to which the user or administrator is attempting to access. In the context of a remote system such as management station 110 depicted in FIG. 1, the smart card reader (120) is not physically connected to server 102 to which the user is attempting to gain access. In any event, authentication module 212 as depicted in FIG. 3 further includes determining (block 308) whether smart card 125 was verified. If smart card 125 was verified in block 308, access to the server is granted in block 310. If either the user identification/password submitted for verification in block 304 or the smart card verification in block 308 fails, access is denied and authentication module 212 is restarted or otherwise aborted.

Thus, as depicted and described with respect to FIG. 2 and FIG. 3, server 102 of information handling system 100 as depicted in FIG. 1 requires two-factor authentication including authentication of a physical device such as the smart card 125 depicted in FIG. 1. In conventionally implemented management stations, two-factor authentication is problematic because the server does not have a mechanism to communicate with and receive information from a remote smart card reader. In the absence of such a mechanism, the remote administrator is unable to complete the physical device verification portion of the authentication procedure. A network administrator attempting to access a server would be forced to bring a card reader to the server, connect the card reader to the server via a USB or other suitable bus, insert a smart card into the reader, return to the management station and log in remotely from the management station. It will be apparent to those skilled in the field of network systems management that this type of procedure is unduly cumbersome. In one aspect, information handling system 100 as depicted in FIG. 1 addresses this problem by providing a virtual card reader on server 102. Before describing details of the virtual card reader, selected elements of an implementation of server 102 are described.

Referring now to FIG. 4, selected elements of a suitable implementation of server 102 are depicted. In the depicted embodiment, server 102 includes one or more general purpose microprocessors 401-1 through 401-N (generically or collectively referred to herein as processor(s) 401). Processors 401 share access to a system memory 410 via a local bus 402 that is connected to a bridge/memory controller 404. A memory bus 408 connects bridge/memory controller 404 with system memory 410. Bridge/memory controller 404 may also provide an interface between a local bus 402 and an I/O bus 412. I/O bus 412 is suitable for attaching one or more peripheral adapters.

In the depicted implementation, a network interface card (NIC) 420 and a serial interface 414 are connected to I/O bus 412. NIC 420 provides an interface between server 102 and a network 104. Network 104 may represent an intranet such as a local area network (LAN). Alternatively, network 104 may represent a wide area network such as the Internet. Serial interface 414 may implement or support any number of serial protocols. In one embodiment, for example, serial interface 414 is implemented as a USB (universal serial bus) interface.

Serial interface 414 provides an interface between I/O bus 412 and a remote access resource referred to herein as remote access controller (RAC) 450. Although depicted as separate entities, serial interface 414 and RAC 450 may be integrated into a single adapter. RAC 450 as depicted in FIG. 4 includes an Ethernet interface and may include other interfaces. RAC 450 communicates with a service processor resource 430. Service processor resource 430 is connected to and shares NIC 420 with server 102. Communication between service processor resource 430 and RAC 450 as shown in FIG. 4 includes communication over an intelligent platform management interface (IPMI) link 432. Among other things, IPMI defines a format for communicating between a baseboard sensor such as service processor resource 430 and a chassis sensor such as RAC 450. IPMI link 432 may, for example, be used to communicate server events to RAC 450 so that RAC 450 can maintain an event log.

Figure 5:
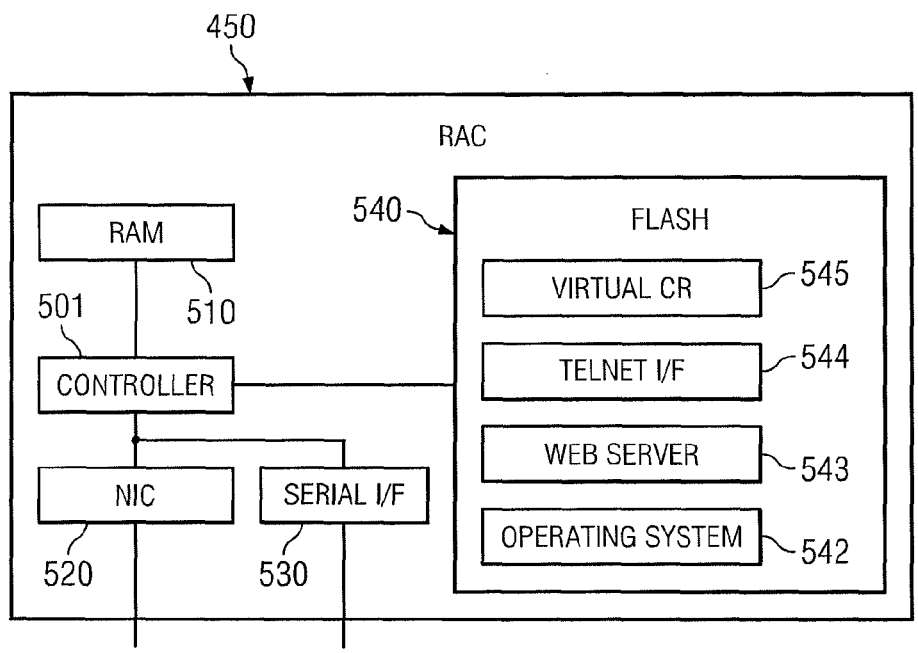
FIG. 5 is a block diagram of selected elements of a remote access controller suitable for use in the server of FIG. 4.

Turning now to FIG. 5, selected elements of an implementation of RAC 450 as depicted in FIG. 4 are presented. In the depicted implementation, RAC 450 includes a microcontroller 501, its own network interface card 520, a serial interface 530, and a flash memory device 540. In addition, RAC 450 as depicted in FIG. 5 includes access to random access memory (RAM) 510. RAM 510 provides scratch memory for microcontroller 501. In the depicted implementation, flash memory device 540 includes a RAC operating system 542, a web server 543, a telnet interface 544, and a virtual smart card reader 545. RAC 450 supports features including console redirection, power management, system alerts, and system event logs. In addition, the inclusion of a virtual smart card reader 545 enables RAC 450 as depicted in FIG. 5 to support remote two-factor authentication as described in greater detail below. RAC 450 may be implemented as a printed circuit or adapter card such as a conventional PCI card. In other implementations, RAC 450 may be implemented as a daughter card that mounts directly onto a mother board.

Figure 6:
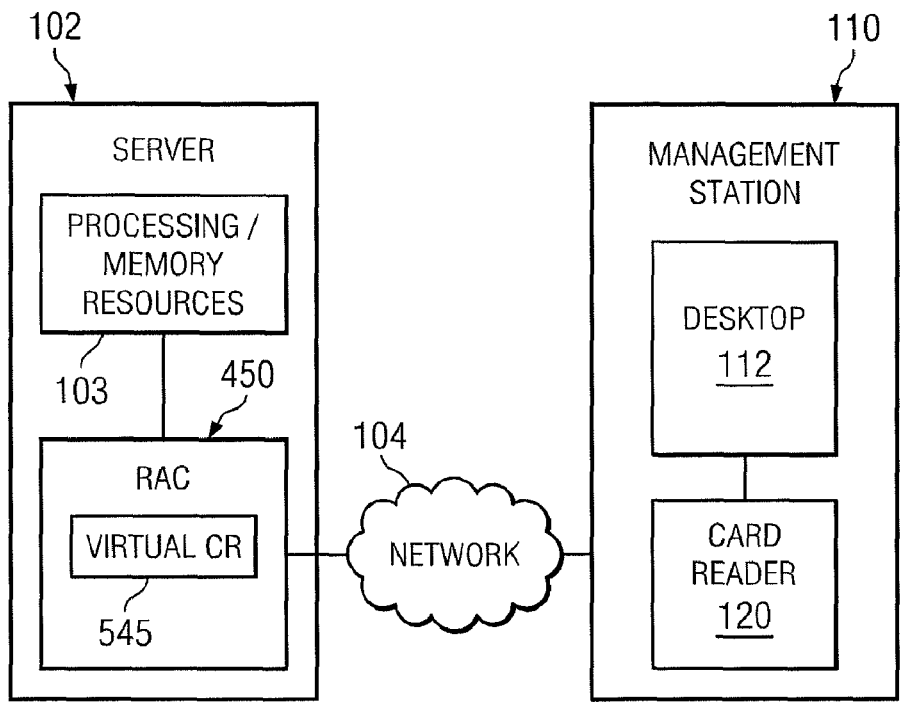
FIG. 6 is a conceptual depiction of a virtual smart card reader architecture.
Figure 7:
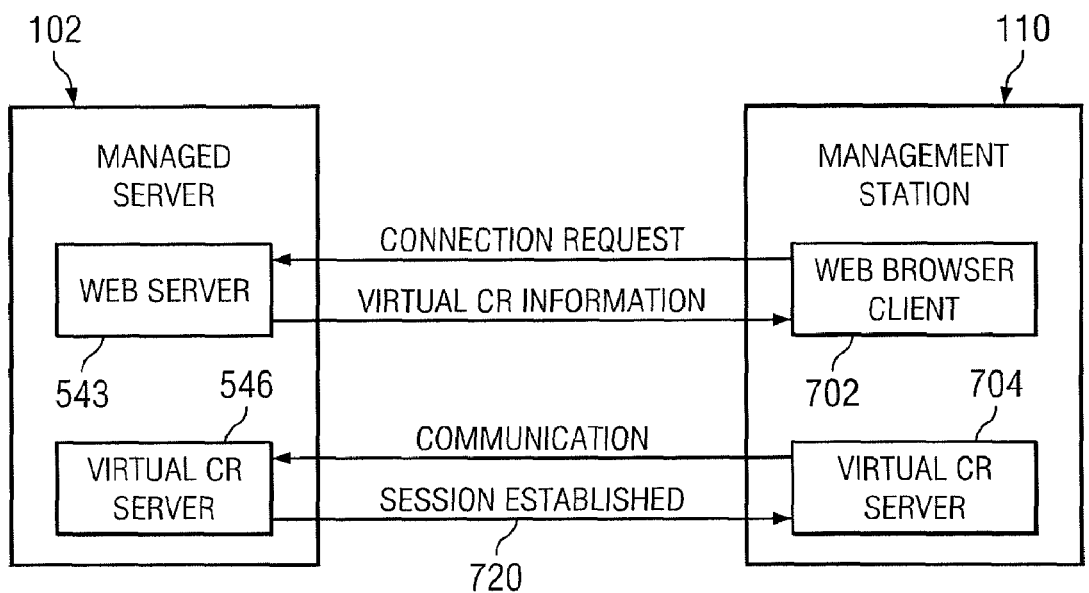
FIG. 7 is a conceptual representation of a virtual smart card reader client/server model.

Turning now to FIG. 6 and FIG. 7, highly abstracted depictions of information handling system 100 emphasizing the use of a virtualized card reader on the server to facilitate remote authentication is illustrated. In the depicted illustration, server 102 includes RAC 450, which has a virtual card reader 545. Virtual card reader 545 provides a facility that appears to the operating system and BIOS of server 102 as a physical card reader device. Virtual card reader 545 is module that simulates an electronic device embedded in the firmware of RAC 450 and controlled by its firmware. As described below, virtual card reader 545 is implemented as a virtual card reader server on RAC 450 and a virtual card reader client installed on management station 110.

FIG. 6 depicts the overall architecture of the virtual card reader feature. Management station 110 provides a physical card reader referred to herein as remote card reader 120. Management station 110 is connected to managed server 102 through network 104. The depicted illustration of managed server 102 depicts traditional processing/memory resources 103 (as illustrated in FIG. 4) coupled to RAC 450, which includes virtual card reader 545.

In the embodiment depicted in FIG. 7, virtual card reader functionality is achieved using a client/server model with web based applications and extensions thereof including a web server 543 on managed server 102, a web browser client 702 on management station 110. Similarly, virtual card reader 545 is implemented as a virtual card reader server 546 on managed server 102 in communication with a virtual card reader client 704 on management station.

In some embodiments, virtual card read client 704 is a plug-in that is downloaded from RAC 450. Virtual card reader client 704 may be installed when an administrator uses management station 110 and web browser client 702 to access a console redirection function of RAC 450 for the first time or when a new version of the plug-in becomes available. Thus, virtual card reader server 546 runs in the firmware of RAC 450 on managed server 102 while virtual card reader client 704 runs on management station 110.

When an administrator or other user accesses the web server 543 of RAC 450, a graphical user interface (GUI) that includes a console redirection page appears. In some embodiments, accessing the console redirection page launches virtual card reader 545 to establish a virtual card reader connection 720 between virtual card reader server 546 and virtual card reader client 704. When virtual card reader connection 720 is established, all virtual card reader access requests from managed server 102 are directed to virtual card reader client 704 on management station 110 through network 104. Virtual card reader client 704 processes all requests, accesses local card reader 120, and sends responses back to virtual card reader server 546 on managed server 102. Virtual card reader server 546 then relays the responses to virtual card reader device 545 embedded in RAC 450.

When virtual card reader 545 is not connected, RAC 450 responds to any card reader access commands with a "not present" error message. The virtual card reader implementation depicted in FIG. 7 may employ security by requiring web browser client 702 to obtain a virtual card reader secret key from server 102. After obtaining the secret key, web browser client 702 may then provide the secret key to virtual card reader client 704. Virtual card reader client 704 can then authenticate itself to virtual card reader server 546. Upon successful secret key authentication between virtual card reader client 546 and virtual card reader server 704, virtual card reader connection 720 is established.

Some embodiments of the present invention may be implemented as a sequence of computer executable instructions (computer software). In these embodiments, the instructions may be embedded on a computer readable medium such as a system memory of an information handling system or on a persistent media device such as a magnetic hard disk or a CD, DVD, flash memory device, or other suitable persistent storage device. In some embodiments, the computer executable instructions, when executed by an information handling system, facilitate remote, two-factor, authentication between a management station or other remote system and a managed server.

Figure 8:
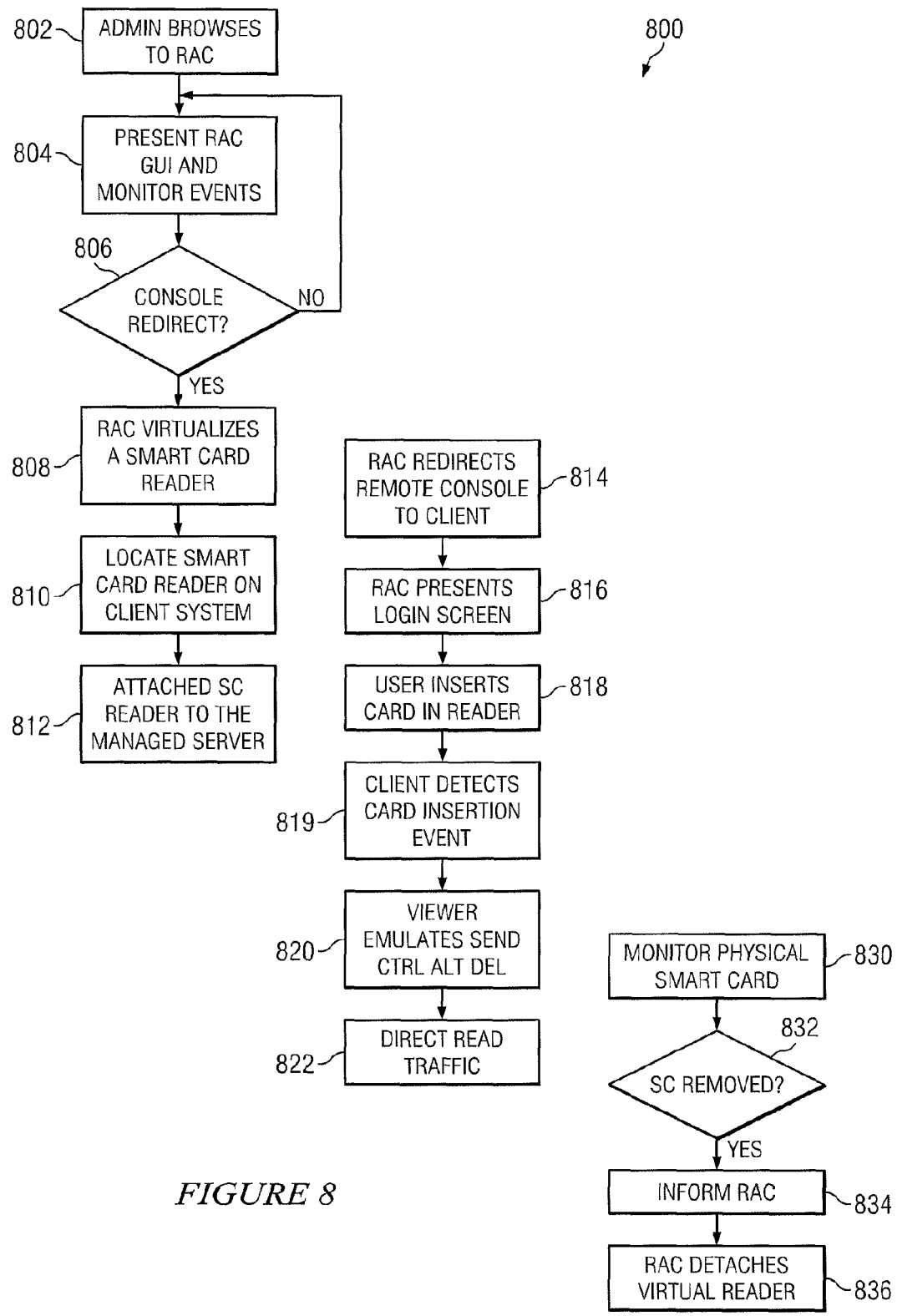
FIG. 8 is a flow diagram of selected elements of a method for remote, two-factor authentication.

Turning now to FIG. 8, a block diagram illustrating selected elements of an embodiment method 800 of implementing remote, two-factor authentication are depicted. In the depicted embodiment, authentication method 800 is initiated when a user or administrator connects (block 802) to RAC 450. Connecting to RAC 450 may include the administrator opening web browser client 702 on management station 110 and browsing to RAC 450 by entering a URL or IP address associated with web server 543 of RAC 450. RAC 450 responds by presenting (block 804) the administrator with a graphical user interface (GUI). Web server 543 of RAC 450 then monitors for events entered by the administrator.

Upon detecting (block 806) initiation of a console redirection session, RAC 450 virtualizes (block 808) a smart card reader in its firmware by downloading virtual card reader client 704 to management station 110 and establishing virtual card reader connection between virtual card reader server 546 and virtual card reader client 704.

RAC 450 then uses virtual card reader connection 720 to locate (block 810) physical smart card reader 120 on management station 110 and attach (block 812) smart card reader 120 to managed server 102. At this point, a secure channel has been established between the client-side physical card reader 120 and the server-side virtual card reader 545 of RAC 450. As part of its console redirection functionality, RAC 450 also redirects (block 814) console traffic including keyboard/mouse traffic and graphic video or text video traffic to management station 110. Using redirection, RAC 450 presents (block 816) a login screen to the user of management station 110.

In conjunction with the two-factor authentication required by managed server 102, virtual card reader client 704 detects (block 819) a card insertion event when the user inserts (block 818) a card into physical smart card reader 120. In response detecting the insertion event, web browser client 702 sends (block 820) a Ctrl-Alt-Delete sequence to the managed server 102 to emulate smart card insertion. At this point, all card reader "read" traffic is redirected to management station 110 while all return data from the smart card reader is redirected to managed server 102. In the preferred embodiment, all card reader traffic is 128 bit SSL encrypted to ensure security. If a smart card is inserted into smart card reader 120 when the Ctrl-Alt-Delete sequence is sent, remote two-factor authentication can be completed.

As depicted in FIG. 8, method 800 further includes monitoring (block 830) of smart card reader 120 by virtual card reader client 704. If virtual card reader client 704 detects (block 832) smart card removal, it informs (block 834) RAC 450. RAC 450 responds to an indication that the smart card has been removed from card reader 120 by closing (block 836) virtual card reader connection 720 thereby revoking the authentication.

Although the disclosed embodiments have been described in detail, it should be understood that various changes, substitutions, and alterations can be made to the embodiments without departing from their spirit and scope.

What is claimed is:

1. A system, comprising:
    an information handling system comprising:
        a processor and system memory accessible to the processor;
        a remote access controller coupled to the processor, wherein the remote access controller includes a virtual card reader; and
    a management station communicatively coupled to the information handling system, wherein the management station is remotely located from the information handling system, and wherein the management station comprises a physical card reader configured to read a physical card;
    wherein when a connection between the information handling system and the management station is established, the remote access controller is configured to:
        provide a virtual card reader client to the management station;
        establish a connection between the virtual card reader of the information handling system and the virtual card reader client on the management station;
        locate the physical card reader of the management station via the established connection; and
        receive, from the virtual card reader client, a card insertion command that emulates insertion of a virtual card into the virtual card reader in response to insertion of the physical card into the physical card reader; and
    wherein the virtual card reader is configured to receive information from the physical card via the physical card reader and the established connection between the virtual card reader client and the virtual card reader, in response to receiving the card insertion command.

2. The system of claim 1, wherein the information handling system includes an authentication module requiring two factor authentication including userid/password authentication and a physical card authentication and further wherein the established connection enables remote physical card authentication.

3. The system of claim 2, wherein the remote access controller is further configured to support redirection of system console traffic enabling remote userid/password authentication.

4. The system of claim 1, wherein the remote access controller is further configured to direct console traffic of the system to the management station to display a system login screen on the management station.

5. The system of claim 1, wherein the remote access controller is communicatively coupled to a service processor resource by an IPMI connection.

6. A computer program product comprising computer executable instructions, stored on a computer readable medium, for enabling remote authentication to a server using a remote access controller of the server, the instructions comprising:
    instructions for establishing a connection between the server and a management station remotely coupled to the server, the management station comprising a physical card reader, the server including a virtual card reader;
    instructions for providing a virtual card reader client to the management station;
    instructions for establishing a connection between the virtual card reader of the server and the virtual card reader client on the management station;
    instructions for locating the physical card reader of the management station via the established connection;
    instructions for emulating insertion of a virtual card into the virtual card reader upon receiving, from the virtual card reader client, a card insertion command generated in response to insertion of a physical card into the physical card reader; and
    instructions for receiving information at the virtual card reader from the physical card via the physical card reader and the established connection between the virtual card reader client and the virtual card reader, in response to emulating insertion of the virtual card.

7. The computer program product of claim 6, wherein the instructions for emulating insertion of a virtual card comprise a Ctrl Alt Del sequence.

8. The computer program product of claim 6, further comprising instructions for detecting a removal of the physical card from the physical card reader.

9. The computer program product of claim 8, further comprising instructions for responding to said removal by closing the established connection.

10. The computer program product of claim 6, further comprising instructions for providing a web server.

11. A remote access controller for use in an information handling system comprising:
   a processing unit;
   a memory communicatively coupled to the processing unit; and processing instructions encoded in the memory, the processing instructions when executed by the processing unit being operable to:
   provide a virtual card reader client to a management station remotely coupled to the information handling system, the management station comprising a physical card reader, the information handling system including a virtual card reader;
   establish a connection between the virtual card reader of the information handling system and the virtual card reader client on the management station; locate the physical card reader of the management station via the established connection; and
   emulate insertion of a virtual card into the virtual card reader upon receiving, from the virtual card reader client, a card insertion command generated in response to insertion of a physical card into the physical card reader;
   wherein the virtual card reader information handling system is configured to receive information from the physical card reader via the physical card reader and the established connection between the virtual card reader client and the virtual card reader, in response to emulating insertion of the virtual card.

12. The remote access controller of claim 11, wherein the established connection is suitable to communicate smart card reader access requests and responses between the remote access controller and the physical card reader.

13. The remote access controller of claim 11, wherein the remote access controller supports two factor authentication including userid/password authentication and a physical card authentication and further wherein the established connection enables remote physical card authentication.

14. The remote access controller of claim 13, wherein the remote access controller further supports redirection of system console traffic enabling remote userid/password authentication.

15. The remote access controller of claim 11, wherein the processing instructions are further operable to direct console traffic of the information handling system to the management station to display a system login screen on the management station.

\* \* \* \* \*